United States Patent [19]

Hoffmann

[11] Patent Number: 4,895,222
[45] Date of Patent: Jan. 23, 1990

[54] CONSTANT LEVEL OILER

[75] Inventor: Ralph M. Hoffmann, Eden Prairie, Minn.

[73] Assignee: Foxport, Inc., Eden Prairie, Minn.

[21] Appl. No.: 300,792

[22] Filed: Jan. 23, 1989

[51] Int. Cl.$^4$ .............................................. G05D 9/02
[52] U.S. Cl. ............................ 184/103.1; 184/105.1; 184/55.1; 184/65; 141/230; 141/66
[58] Field of Search .................. 184/103.1, 105.1, 7.4, 184/109, 55.1, 65, 84, 80; 123/196 S; 222/64; 141/230, 309, 65, 66; 137/453, 454, 588

[56] References Cited

U.S. PATENT DOCUMENTS

| | | | |
|---|---|---|---|
| 2,564,230 | 8/1951 | Pitney | 184/103.1 |
| 2,760,599 | 8/1956 | Sunden | 184/103.1 |
| 2,979,161 | 4/1961 | Lyden | 184/103.1 |
| 4,342,376 | 8/1982 | Lyden | 184/103.1 |

OTHER PUBLICATIONS

Data Sheet, Oil-Rite Corporation, Manitowoc, Wisconsin, Cat. #0103, p. 22.
Data Sheet, Trico Manufacturing Corporation, "Plastic Bottle Opto-Matic Constant Level Oiler".

*Primary Examiner*—Ira S. Lazarus
*Assistant Examiner*—Christopher Hayes
*Attorney, Agent, or Firm*—Hill, Van Santen, Steadman & Simpson

[57] ABSTRACT

A constant level oiler is provided which is ventilated in such a manner so as to eliminate the need for a large surge chamber. Such an oiler has an advantage in that the problems associated with the fluid surge resulting when the lubricated machine is shut down are eliminated. Furthermore, since a large surge chamber is unnecessary in the present device, the attendant costs associated therewith are also eliminated.

7 Claims, 4 Drawing Sheets

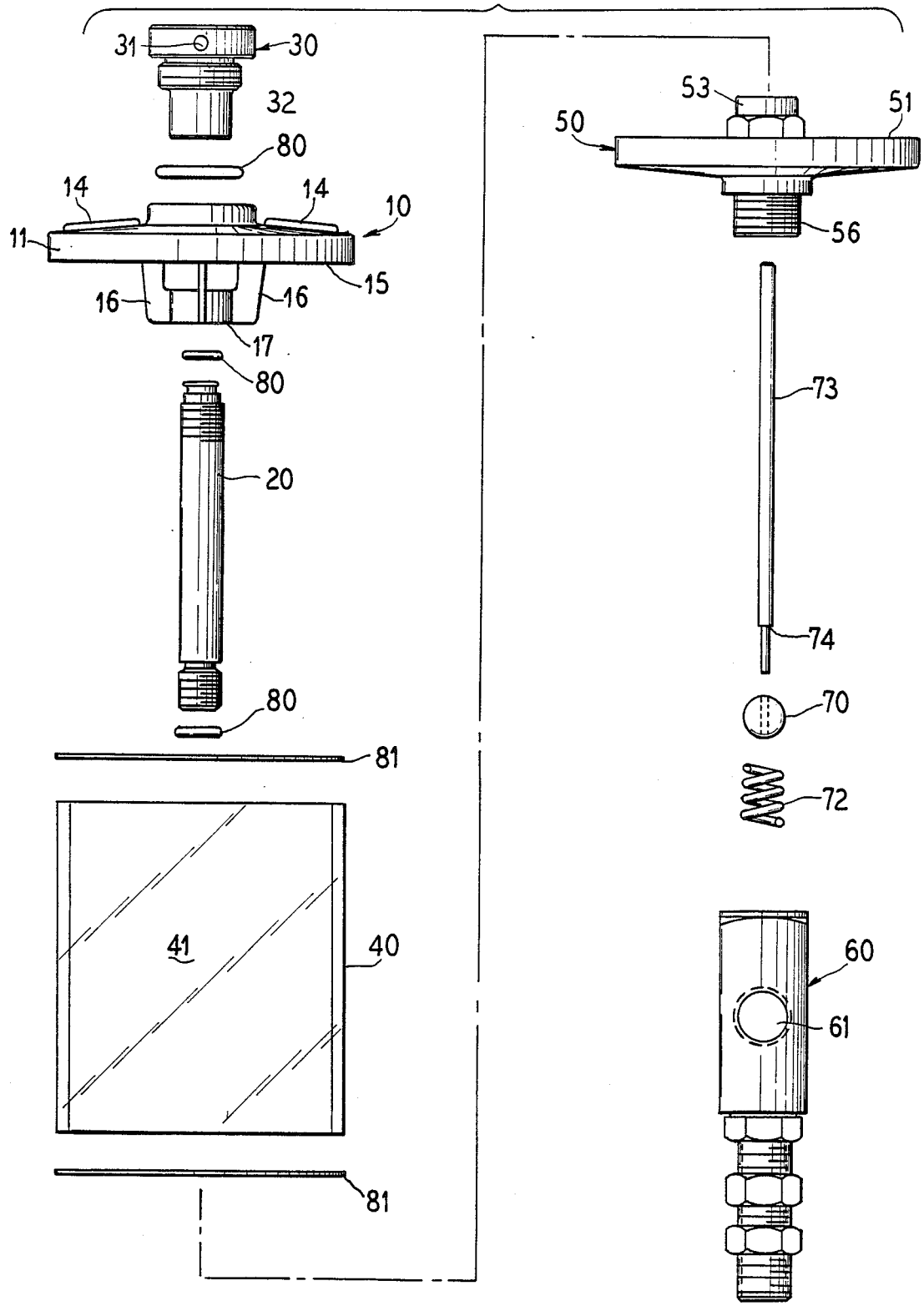

CONSTANT LEVEL OILER

CROSS-REFERENCE TO RELATED APPLICATION

This application is related to my co-pending, commonly assigned patent application entitled "Center Fill Top Cover for Oilers", filed 1/23/89, Ser. No. 300,131.

BACKGROUND OF THE INVENTION

1. Field of the Invention

The present invention relates to a constant level oiler wherein a means for venting is provided which eliminates the need for the large surge chambers inherent in the prior art devices.

2. Description of the Prior Art

Devices known as constant level oilers are employed to provide a steady flow of lubricant from a reservoir containing a lubricating fluid to a piece of operating machinery. Such oilers generally comprise upper and lower cylindrical reservoirs. The upper reservoir effectively stores the lubricating fluid while the lower reservoir supplies the lubricating fluid at a constant level to the machine needing lubrication and acts as a surge chamber when the machine under lubrication is switched off.

In the devices of the prior art, a cover having an aperture in the center thereof to accommodate a filler plug is used to effectively form an air tight seal in the upper portion of the upper reservoir. Separating the upper reservoir and surge chamber is a dividing section having an aperture through the center thereof. A hollow tubular body located about the perimeter of the aperture extends partially into the open region of the surge chamber. In the upper region of the surge chamber, there is a vent aperture which allows venting of a supply of air therethrough. An outlet aperture located in the lower region of the surge chamber is used to allow the lubricating fluid to flow therethrough to the machine needing lubrication.

The prior art oiler also comprises a rod which extends axially through the center of the upper cylinder and which terminates in a valve member that extends into central region of the hollow tubular body in the surge chamber. The rod is upwardly biased by a spring thereby causing the valve member to seal the aperture of the dividing section when the plug is removed during filling. When the plug is secured to the aperture in the top cover, the rod is driven against the bias of the spring thereby opening the aperture in the dividing section and allowing the lubricating fluid stored in the upper reservoir to flow into the surge chamber and therefrom to machine under lubrication. As the fluid enters the surge chamber, the air contained therein is displaced through the vent aperture until the fluid reaches the level defined by the lower portion of the hollow tubular body. Upon reaching such level, the fluid flow from the upper reservoir ceases. It is at this level that the fluid in both the surge chamber and the machine under lubrication is maintained.

As the machine under lubrication uses the fluid, the level of the fluid in the surge chamber is reduced to a level below the constant level defined by the lower portion of the hollow tubular section. As such, air is allowed to flow through the hollow tubular body and into the upper reservoir thereby causing the lubricating fluid to flow downward into the surge chamber to replenish the fluid used and thus maintain the fluid in the surge chamber and machine at a constant level.

Great quantities of the lubricating fluid may be needed to establish an operating fluid level since such fluids generally adhere to the portions of the machine which are in motion. Consequently, when the machine under lubrication is shut down, a new level of fluid is established above the running level thereby causing the fluid to surge back into the surge chamber. As such, the surge chamber must have a fluid capacity which is sufficiently large enough to accommodate the surge without allowing the fluid to overflow from the vent aperture. The need for such a large surge chamber increases the cost of the oiler and proves to be a burden in applications having limited space availability.

It is an object of the present invention to provide a constant level oiler wherein the need for a large surge chamber is eliminated thereby providing cost and space savings over the constant level oilers of the prior art.

It is a further object of the present invention to specify a constant level oiler wherein the attendant ill-affects of lubricating fluid overflow caused by machine shutdown are eliminated.

SUMMARY OF THE INVENTION

A constant level oiler is provided wherein specialized venting components are utilized to eliminate the need for a surge chamber. Specifically, the invention utilizes a single reservoir having a top cover with an aperture therein to accommodate a plug. The plug, or alternatively the top cover, possesses a ventilation aperture through which a flow of air may proceed into a hollow cylindrical tube which extends axially through the center of the reservoir and which threadedly engages both the top cover and a bottom cover disposed at the bottom of the reservoir. At the points where the hollow cylindrical tube engages the covers, seals are formed which effectively prevent a direct exchange of air and fluid from the hollow tube to the reservoir. Any transfer of air between the hollow tube and reservoir ensues through flow regions located in the bottom cover. Such flow regions proceed from the bottom cover to the hollow tube and the bottom cover to the reservoir respectively.

Attached to the bottom cover of the reservoir is a hollow shank member to which feed tubes are attached which couple the oiler to the machine needing lubrication. A threaded outlet aperture is provided for connecting the feed tubes.

A rod extends axially through the center of the hollow cylindrical tube and proceeds into the shank member to engage a blocking sphere. Located beneath the blocking sphere in the shank member is a spring which provides an upward bias thereto. When the plug is removed, the blocking sphere, with the aid of the spring bias, seals the flow aperture to prevent the flow of lubricating fluid therethrough while filling the reservoir.

Placing the plug into position after filling causes the plug to push against the rod which forces the blocking sphere against the spring bias to open the flow aperture. With the flow aperture open, the lubricating fluid proceeds into the shank member and therefrom to the machine needing lubrication. As the fluid in the reservoir proceeds into the shank member, the air pressure in the reservoir becomes less than the atmospheric pressure and causes a corresponding pressure differential at the bottom of the hollow tube. At a specified point, the pressure differential will be negligible thereby preventing a further flow of fluid from the reservoir. Such a point will exist when the level of fluid in the shank reaches the level defined by the bottom of the hollow tube. Given the fact that the machine under lubrication is subjected to the same ambient gas pressure conditions, the fluid in the machine will be maintained at the constant level defined by the bottom of the hollow tube.

As the machine consumes the lubricating fluid, the pressure differential at the bottom of the hollow tube increases until a flow of air, in the form of bubbles, proceeds into the reservoir and displaces a corresponding amount of fluid. As such, the constant level of the lubricating fluid is maintained.

When the machine is shut down, the fluid surge caused by the release of the fluid adhering to the moving machine parts proceeds directly into hollow tube at the center of the reservoir, such that the proposed invention embodies the device where the surge level is equal to the vertical height of the entire reservoir.

BRIEF DESCRIPTION OF THE DRAWINGS

Other objects, features and advantages of the invention will best be understood from the following detailed description taken in conjunction with the accompanying drawings, of which:

FIG. 3 is an exploded view of the present invention showing the various components which make up the device assembly.

DESCRIPTION OF THE PREFERRED EMBODIMENT

Figure 1:
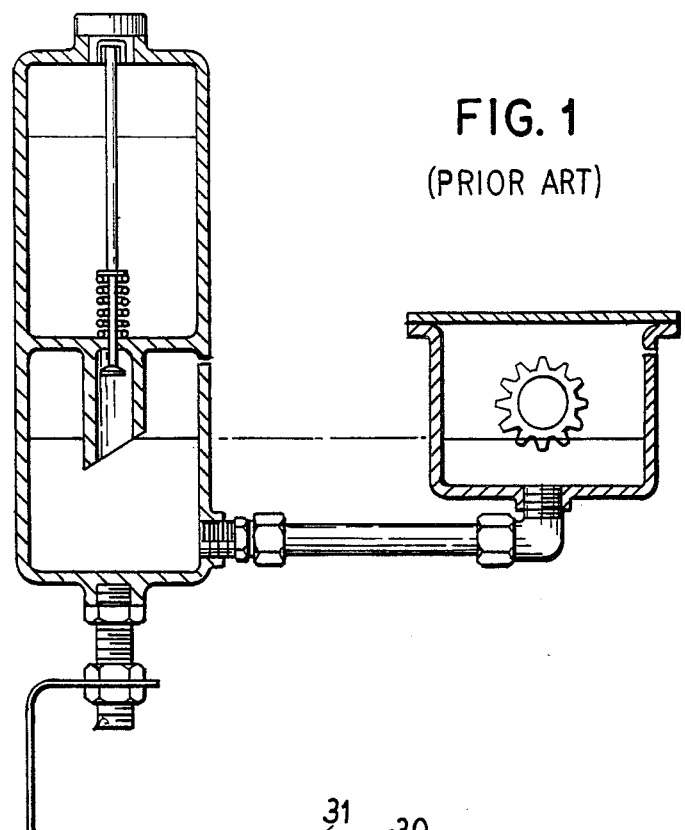
FIG. 1 is a constant level oiler showing the features present in the prior art.
Figure 4:
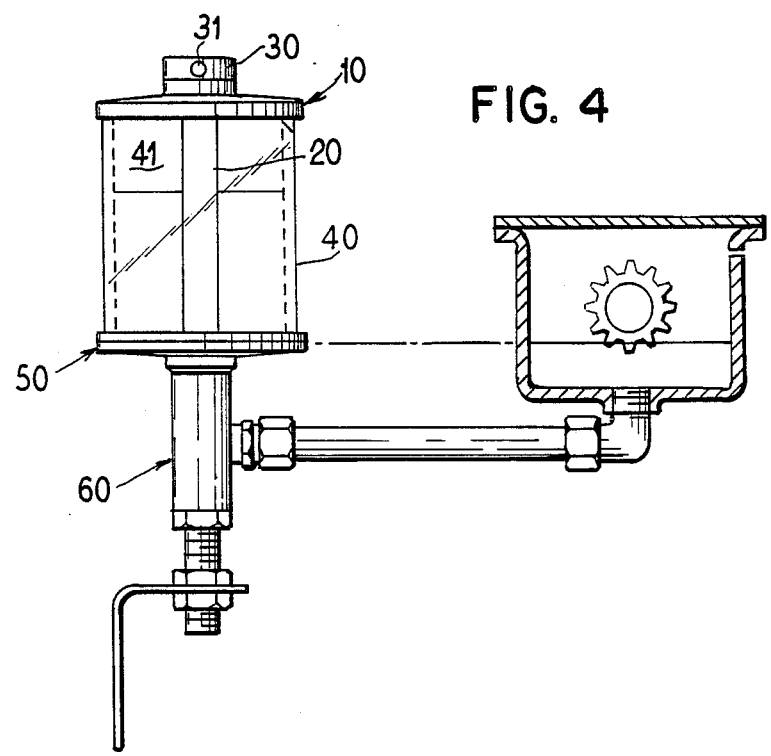
FIG. 4 is a side elevational view of the present device operatively attached to a machine.
Figures 2, 5:
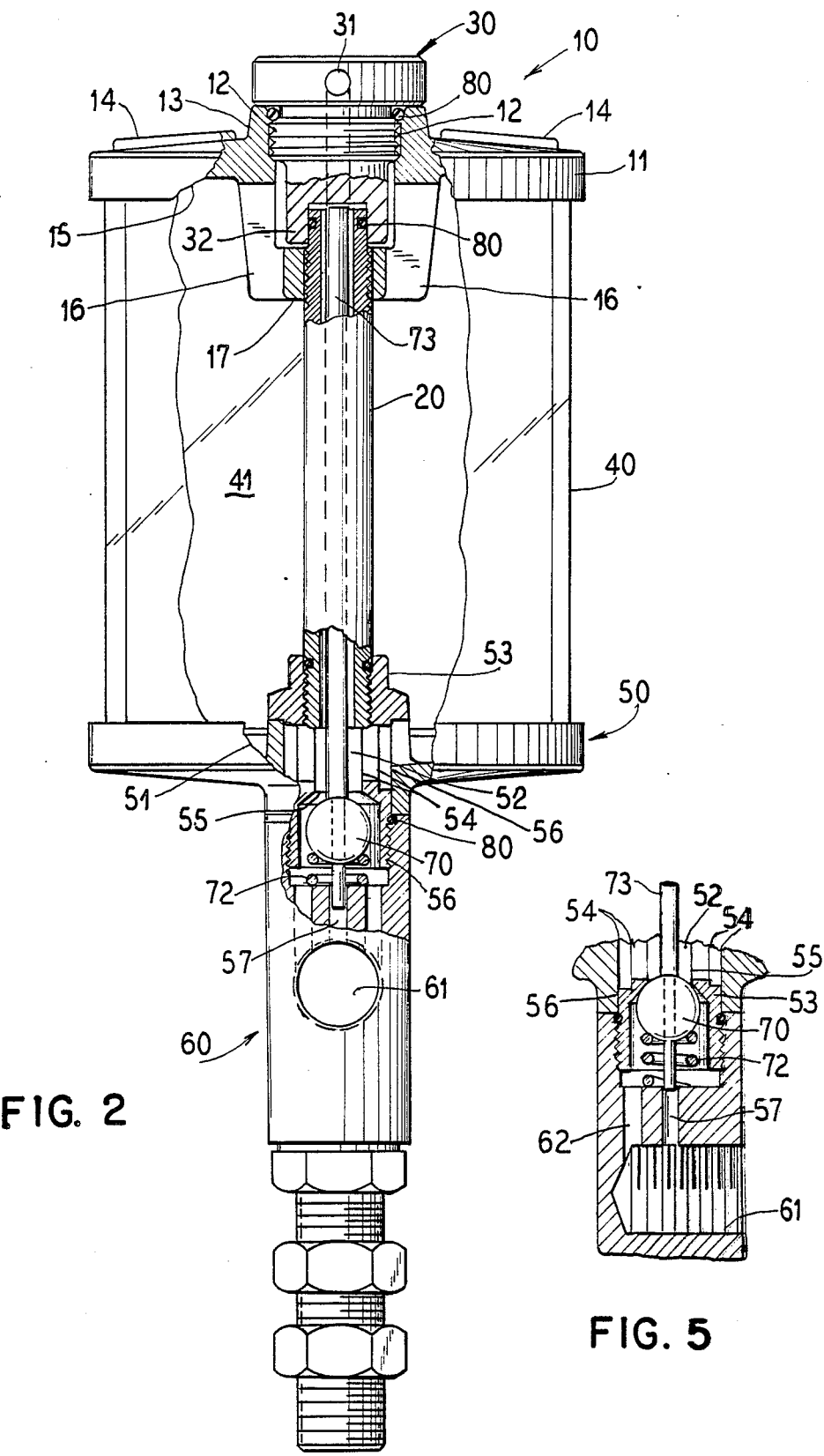
FIG. 2 is a side elevated view of the present invention showing cutaway sections which display several of the inventive features of the device.
FIG. 5 is an exploded view of the connection between the bottom cover and shank member showing the valve in a closed position.

The device as shown in FIG. 2 has a top cover 10 comprising a disc-shaped body 11 with an aperture through the center which is defined by threaded sidewalls 12. A hub 13 proceeds upwardly from the disc-shaped body 11. Oblong protrusions 14 extend upwardly from the disc-shaped body 11 and are oriented radially from the center thereof to facilitate grasping of the cover. A further hub 15 proceeds downwardly about the perimeter of the disc-shaped body 11.

A plurality of arms 16 extend downward from the disc-shaped body 11 about the sidewalls 12 of the aperture. The arms 16 are spaced apart so as to create a substantially open region therebetween. The arms 16 attach about an annular body 17 having a further threaded aperture in the center. A hollow tube 20 threadedly engages the further threaded aperture of the annular body 17.

A plug 30 having a vent aperture 31 therethrough threadedly engages the sidewalls 12 of the aperture of the disc-shaped body 11. The upper portion of the plug 30 engages the hub 13 of the top cover. Another hub 32 proceeds from the plug 30 and engages the outer perimeter of the hollow tube 20 thereby forming an effective seal therebetween which limits the flow of any air entering the vent to the region defined by the hollow tube 20.

The top portion of a reservoir cylinder 40 engages the hub 15 of the top cover 10. A bottom cover 50 having an aperture 56 in the center thereof contacts the lower portion of the reservoir cylinder 40 about the hub 51. A hollow neck member 53 proceeds through the aperture 56 and threadedly engages the hollow tube 20 at the upper portion thereof. In the hollow neck member 53, there is an intermediate chamber 52 located in the lower region of the connection point between the neck member 53 and hollow tube 20. Substantially open flow regions 54 proceed from the intermediate chamber 52 into the interior of the reservoir 40. A flow aperture 55 proceeds from the intermediate chamber 52 into the lower portion of the neck member 53. The exterior sidewall of the lower portion of the neck member 53 is threaded to engage a shank member 60. The shank member 60 has a threaded outlet aperture 61 through which the fluid may proceed from a flow channel 62 to the machine needing lubrication. Axial forces which are present when the hollow tube 20 is threadedly attached simultaneously to both the top cover 10 and the shank member 60 effectively hold the reservoir assembly formed by such components together.

Interior to the shank member 60 in the flow region between the bottom cover 50 and shank member 60, there is a valve assembly comprising a blocking sphere 71, spring 72 and rod 73. The rod 73 extends axially through the hollow tube 20, through the diameter of the blocking sphere 70, axially through the center of the helix of the spring 72 and terminates in a guide bore 57. The diameter of the rod 73 differs at the two ends thereof. At the upper end, the rod 73 has a diameter which is slightly less than the inside diameter of the hollow tube 20. At the lower end, the diameter decreases to form a lip 74 which contacts the blocking sphere 70. The spring 72 provides an upward bias to the blocking sphere 70 and rod 73 so as to force the sphere 70 against the flow aperture 55 when the plug 30 is removed for filling the reservoir 40 thereby forming an effective seal therebetween. Upon proper placement of the plug 30, the rod 73 is forced down so that the lip 74 is urged against the blocking sphere 70 and against the bias of the spring 72. As such, the blocking sphere 70 is forced away from the flow aperture 55 thereby allowing the fluid from the reservoir 40 and intermediate chamber 52 to flow therethrough.

It is important to note that the reservoir chamber 41 is effectively isolated from the atmosphere when the plug 30 is properly in place and an amount of lubricating fluid is contained therein. Any air entering the vent 31 is therefore confined to the interstitial region between the rod 73 and sidewalls of the hollow tube 20 by the barrier formed by the lubricating fluid. To further promote the isolation, O-rings 80 are placed at strategic points of connection. Furthermore, gaskets 81 are placed at the meeting regions between the reservoir 40 and top cover 10 and between the lower cover 50 and the reservoir 40.

With the plug 30 properly in place and the blocking sphere 70 cleared from the flow aperture 55, the lubricating fluid proceeds into the shank member 60 and to the machine needing lubrication. Since the reservoir chamber 41 is effectively isolated from the atmosphere, the air pressure therein decreases to a level below the atmospheric pressure existing at the bottom of the hollow tube 20. As the liquid continues to enter the shank 60, the pressure differential increases to the point at which air flows from the bottom of the hollow tube 20 into the reservoir chamber thereby displacing a corresponding amount of lubricating fluid. At an ascertainable equilibrium point, the pressure differential will be such as to prevent a further flow of fluid from the reservoir 40. Such a point will exist when the level of fluid in the shank member 60 reaches an equilibrium level defined by the bottom of the hollow tube 20. Assuming an atmospheric pressure at 14.7 psia, the sub-atmospheric pressure above the oil in the reservoir chamber 41 is equal to 14.7 psia minus the oil pressure existing at the bottom of the hollow tube 20. Since both the oiler and machine being lubricated are subject to the same ambient gas conditions, the fluid in the machine will be maintained at the constant level defined by the level at which the bottom of the hollow tube 20 opens to the intermediate chamber 52.

As the machine needing lubrication consumes the lubricating fluid, the fluid level recedes from the bottom of the hollow tube 20. Consequently, the oil no longer covers the bottom of the tube 20 so that the atmospheric pressure in the tube 20 now exceeds the sum of the oil pressure in the reservoir chamber 41 plus the sub-atmospheric pressure above the oil. The greater atmospheric air pressure in the hollow tube 20 forces a bubble of air out the bottom of the tube which immediately rises through the oil to the top of the reservoir chamber 41 thereby allowing an equal volume of oil to descend therefrom. Such sequence of events continues until the bottom of the tube 20 is again covered by oil thereby effectively acting as a liquid on/off valve.

When the machine needing lubrication is shut down, the surge caused by the release of fluid adhering to the moving machine parts raises the oil level in the machine thereby exerting pressure on the oil in the oiler and causing a rise in the oil level in the shank 60. Oil will thereafter rise in the interior of the bottom tube 20 in concert with the raised oil level in the machine. As it rises at the bottom of the tube 20, it will exert a pressure on the oil in the reservoir chamber 41 which will also rise an infinitesimal amount. A further increase in the oil level in the machine will cause the oil to rise still further in tube 20 until such a time, if necessary, the oil therein achieves the same level as the oil in the reservoir chamber 41. Thereafter, any further rise will cause an increase in the level of oil in the chamber 41 until the pressure therein is atmospheric and equal to that in the machine. A further rise, most likely, will not occur solely in the tube 20 therefore an overflow from the top of the oiler is highly unlikely. Such an overflow could only occur if a person were to continuously pour oil into the machine.

Figure 6:
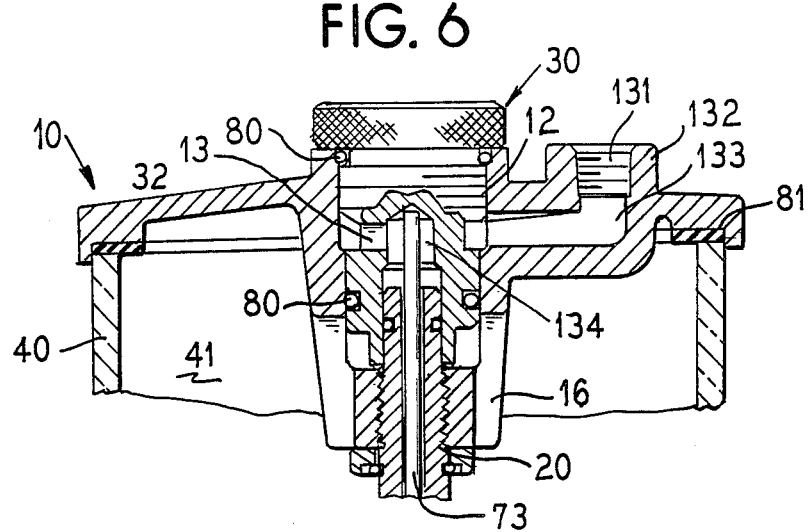
FIG. 6 is an exploded view of a further embodiment of the present invention.
Figure 7:
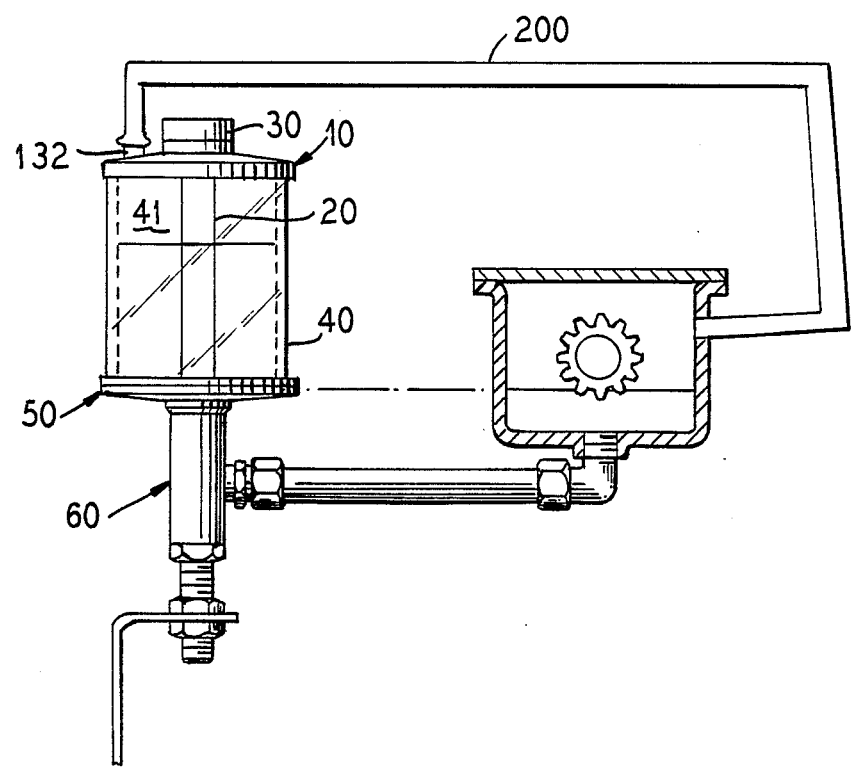
FIG. 7 is a side elevational view of the further embodiment operatively attached to a machine.

As previously noted, both the vent inlet 31 and the machine needing lubrication must be subject to the same ambient gas conditions for proper oiler operation. However, in many instances, the pressure within the machine may exceed the atmospheric pressure when the machine needing lubrication begins operating thereby creating a pressure imbalance which may impede the performance of the oiler. FIG. 6 and FIG. 7 show a preferable embodiment to compensate for the pressure imbalance in such situations.

As shown in FIG. 6, the venting in the alternative embodiment does not ensue through the cap 30 by way of the vent aperture 31. Rather, the top cover 10 is provided with a vent connection aperture 131 which is located radially outwardly from the center thereof. A connection hub 132 proceeds upwardly about the perimeter of the vent connection aperture 131. Extending from the vent connection aperture 131 and situated perpendicularly thereto is a longitudinal vent flow chamber 133 which terminates in a substantially open vent region 134 located in the top cover 10 about top of the hollow tube 20.

As shown in FIG. 7, a hollow pipe 200 is connected about the connection hub 132 and extends to the air intake vent of the machine needing lubrication for allowing a free exchange of gases therebetween. As such, both the oiler and machine are subject to the same ambient gas conditions thereby compensating for any pressure differential occurring when the machine begins operating.

Although changes and modifications may be suggested by those skilled in the art, it is the intention of the inventor to embody within the patent warranted hereon any changes and modifications as reasonably and properly come within the scope of this contribution to the art.

I claim:

1. A constant level oiler comprising:
   reservoir means for holding a supply of lubricating fluid therein;
   top cover means for sealing the upper region of said reservoir means;
   vent means disposed in said top cover means for providing an inlet for ambient gas;
   bottom cover means for sealing the lower region of said reservoir having first and second flow apertures with an intermediate chamber disposed therebetween, said intermediate chamber having a substantially open region extending therefrom to said reservoir means;
   isolation means having one end thereof connected to said vent means and the other end thereof connected to said bottom cover means about said first flow aperture for directing said ambient gas entering said vent means to said intermediate chamber;
   shank means connected to said bottom cover means about said second flow aperture for allowing a flow of said lubricating fluid from said reservoir therethrough to a specified lubrication point.

2. A constant level oiler as recited in claim 1 further comprising valve means for preventing the flow of fluid from said reservoir means to said shank means during filling of said reservoir means.

3. A constant level oiler as recited in claim 2 wherein said valve means comprises:
   ball means disposed in said shank means for blocking the flow of said lubricating fluid therethrough during the filling of said reservoir means;
   spring means for biasing said ball means so that said ball means is positioned to block the flow of said lubricating fluid through said shank means when filling said reservoir means; and
   rod means extending through said isolation means and connected to said ball means for biasing said ball means against the bias of said spring means whenever the oiler functions to deliver said lubricating fluid to said machine thereby moving said ball into a position which allows said lubricating fluid to flow from said reservoir means through said shank means.

4. A constant level oiler as recited in claim 1 wherein said vent means comprises a fill cap having an aperture disposed therethrough.

5. A constant level oiler as recited in claim 1 wherein said isolation means comprises a hollow tube.

6. A constant level oiler as recited in claim 1, wherein said vent means comprises a top cover having a vent connection aperture disposed therein for connecting a hollow pipe thereto, said hollow pipe extending from a vent in said machine needing lubrication thereby to subject said machine and said oiler to the same ambient gas conditions.

7. A method of supplying a lubricating fluid to a machine at a constant level using an oiler comprising a single reservoir region wherein said reservoir and said machine are exposed to the same ambient gas pressure conditions comprising the steps of:

filling said reservoir with a lubricating fluid;
 venting ambient air in the region defined by the uppermost portion of said reservoir;
 isolating said ambient gas from said reservoir in an isolation region;
 providing a flow of lubricating fluid from said reservoir to said machine;
 creating a pressure differential between said ambient gas and said reservoir in the lower region thereof whenever said lubricating fluid exits therefrom;
 flowing said ambient gas through said isolation region to the bottom region of said reservoir to displace said lubricating fluid contained therein whenever said pressure differential is present whereby a constant level of said lubricating fluid is maintained in said machine; and
 allowing said lubricating fluid to enter directly into said isolation region whenever a fluid surge causes said lubricating fluid to return from said machine thereby to equalize the resultant pressure differential between said oiler and said machine.

* * * * *